United States Patent
Chi et al.

(10) Patent No.: US 12,297,369 B2
(45) Date of Patent: May 13, 2025

(54) BRIGHTNESS ENHANCEMENT FILM COATING MATERIAL AND APPLICATION THEREOF

(71) Applicant: Phichem Corporation, Shanghai (CN)

(72) Inventors: Xuhui Chi, Shanghai (CN); Weiguang Zhu, Shanghai (CN)

(73) Assignee: Phichem Corporation, Shanghai (CN)

( * ) Notice: Subject to any disclaimer, the term of this patent is extended or adjusted under 35 U.S.C. 154(b) by 12 days.

(21) Appl. No.: 18/269,802

(22) PCT Filed: Dec. 24, 2021

(86) PCT No.: PCT/CN2021/141076
§ 371 (c)(1),
(2) Date: Jun. 27, 2023

(87) PCT Pub. No.: WO2022/143443
PCT Pub. Date: Jul. 7, 2022

(65) Prior Publication Data
US 2024/0076517 A1    Mar. 7, 2024

(30) Foreign Application Priority Data
Dec. 31, 2020  (CN) .......................... 202011632394.4

(51) Int. Cl.
*C09D 135/08*   (2006.01)
*C08J 7/04*   (2020.01)
*C08J 7/18*   (2006.01)

(52) U.S. Cl.
CPC .......... *C09D 135/08* (2013.01); *C08J 7/0427* (2020.01); *C08J 7/18* (2013.01); *C08J 2335/08* (2013.01)

(58) Field of Classification Search
None
See application file for complete search history.

(56) References Cited

U.S. PATENT DOCUMENTS

| 2006/0069222 A1 | 3/2006 | Chisholm et al. |
| 2008/0143916 A1 | 6/2008 | Fujino et al. |
| 2016/0003984 A1* | 1/2016 | Funakubo ................ G02B 1/04 359/507 |

FOREIGN PATENT DOCUMENTS

| CN | 101061148 A | 10/2007 | |
| CN | 103540240 A | 1/2014 | |
| CN | 103555153 A * | 2/2014 | |
| CN | 104312233 A | 1/2015 | |
| CN | 104312390 A | 1/2015 | |
| CN | 112812596 A | 5/2021 | |
| JP | 2008-28171 A | 2/2008 | |
| JP | 2009-7568 A | 1/2009 | |
| JP | 2018-180537 A | 11/2018 | |
| WO | 2005/062082 A1 | 7/2005 | |
| WO | WO-2018004015 A1 * | 1/2018 | ............... B32B 7/12 |

OTHER PUBLICATIONS

CN103555153A, machine translation. (Year: 2014).*
Arkema Sartomer Americas SR602, https://americas.sartomer.arkema.com/en/product-finders/product/f/sartomer_MonomerAcrylates_US/p/sr602/, accessed Dec. 20, 2024.*

* cited by examiner

*Primary Examiner* — Eli D. Strah
(74) *Attorney, Agent, or Firm* — Hoffmann & Baron, LLP

(57) ABSTRACT

A brightness enhancement film coating material and an application thereof, where preparation raw materials for the coating material, in parts by weight, at least comprise the following components: 20-76 parts a monofunctional photocuring monomer, 20-76 parts a bifunctional photocuring monomer, 1-10 parts a photoinitiator, and 0-4 parts an auxiliary agent. No white streaks are produced after a brightness enhancement film formed by means of the present coating material undergoes a high-temperature high-humidity reliability test, and the adaptability of the brightness enhancement film and a polarizer is improved. Also, a reliability test is able to reflect, to a certain extent, a long-term use situation, and an excellent reliability test result can ensure long-term use stability of a display panel, and fragments produced during a cutting process are prevented from contaminating a film sheet and thereby affecting a use effect thereof.

7 Claims, No Drawings

BRIGHTNESS ENHANCEMENT FILM COATING MATERIAL AND APPLICATION THEREOF

CROSS-REFERENCE TO RELATED APPLICATIONS

This application is the National Stage of International Application No. PCT/CN2021/141076, filed Dec. 24, 2021, which claims the benefit of Chinese Application No. 202011632394.4, filed Dec. 31, 2020, the contents of which is incorporated by reference herein.

TECHNICAL FIELD

The present invention relates to the field of display material, specifically to a brightness enhancement film coating material and the application thereof.

BACKGROUND ARTS

In a TFT-LCD backlight module, components of light source, light guiding plane, diffusion film, brightness enhancement film, reflecting film and the like are comprised, and the main function thereof is to provide an even plane light source for the liquid crystal panel. As a key component of the backlight module, the brightness enhancement film is an optical film having fine micro-structure which can focus light from different emission directions on the front side and improve the brightness of the liquid crystal display panel. However, conventional brightness enhancement films do not possess polarized light reflecting function and the half of the polarized light reflected by the LCD low polarizing film is wasted. Using a polarization-reflection composite brightness enhancement film can greatly improve the brightness of the LCD module.

So far, most commercial brightness enhancement films produce white streaks when being used together with PMMA polaroid after a high-temperature high-humidity reliability test (a reliability test is able to reflect, to a certain extent, a long-term use situation) and the display image is affected. In addition, the edge of the film sheet generates fragments easily when clipping and shaping as well as following processes of transporting and assembling, which causes the appearance of defects on the edge and even worse, dropped fragments spatter on the whole sheet of film and affect the using effects thereof.

In order to solve the above technical problem, the present application provides a brightness enhancement film coating material. No white streaks are produced after a brightness enhancement film formed using the coating material of the present application undergoes a high-temperature high-humidity reliability test, and the adaptability of the brightness enhancement film and a polarizer is improved.

SUMMARY OF THE INVENTION

In order to solve the above technical problem, the first aspect of the present application provides a brightness enhancement film coating material, preparation raw materials for the coating material, in parts by weight, at least comprise the following components: 20-76 parts of a monofunctional photocuring monomer, 20-76 parts of a bifunctional photocuring monomer, 1-10 parts of a photoinitiator and 0-4 parts of an auxiliary agent.

As a preferred technical solution of the present application, the refractive index of the monofunctional photocuring monomer is not lower than 1.5.

As a preferred technical solution of the present application, the fluid viscosity of the monofunctional photocuring monomer is not higher than 200 cps.

As a preferred technical solution of the present application, end groups of the monofunctional photocuring monomer are selected from one of methylacryloxy, acryloxy, ethenyl, allyl.

As a preferred technical solution of the present application, the structure of the bifunctional photocuring monomer is shown as formula 1; R, R' are selected respectively from one of methylacryloxy, acryloxy, ethenyl, allyl; $R_1$, $R_2$ are selected respectively from one of hydrogen, alkyl, alkoxy; m, n are natural numbers;

1

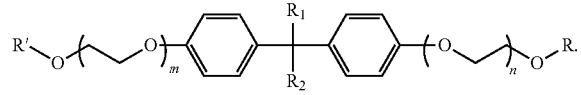

As a preferred technical solution of the present application, the bifunctional photocuring monomer is BPA(EO)$_{m+n}$DA and/or BPA(EO)$_{m+n}$DMA; the structure of the BPA(EO)$_{m+n}$DA is shown as formula 2; the structure of the BPA(EO)$_{m+n}$DMA is shown as formula 3; the BPA(EO)$_{m+n}$DA is ethoxyl modified bisphenol A diacrylate; the BPA(EO)$_{m+n}$DMA is ethoxyl modified bisphenol A dimethacrylate;

2

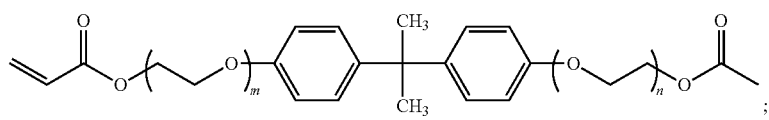

3

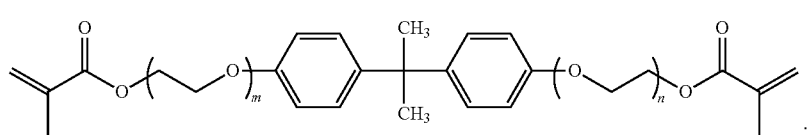

As a preferred technical solution of the present application, 2≤m+n≤40.

As a preferred technical solution of the present application, 10<m+n≤40.

As a preferred technical solution of the present application, 7≤m+n≤10.

As a preferred technical solution of the present application, 2≤m+n≤6.

As a preferred technical solution of the present application, the auxiliary agent at least comprises a slip agent.

As a preferred technical solution of the present application, the slip agent is a polyether modified organosilicon compound.

The second aspect of the present application provides an application of the brightness enhancement film coating material, the brightness enhancement film coating material is applied in a LED display module.

Beneficial effects: the present application provides a brightness enhancement film coating material. No white streaks are produced after a brightness enhancement film formed using the coating material of the present application undergoes a high-temperature high-humidity reliability test, and the adaptability of the brightness enhancement film and a polarizer is improved. Meanwhile, a reliability test is able to reflect, to a certain extent, a long-term use situation, and an excellent reliability test result can ensure long-term use stability of a display panel, and fragments produced during a cutting process are prevented from contaminating a film sheet and thereby affecting a use effect thereof.

DETAILED EMBODIMENTS

The content of the present application may be easier to be understood by referring to the following detailed descriptions of preferred implementation methods and comprised embodiments of the present application. Unless otherwise defined, all technical and scientific terms used herein have the same meaning as commonly understood by those of ordinary skill in the art to which the present application belongs. When contradiction exists, the definitions in the present application are used as standards.

Terms "prepared from" and "include" as used herein are synonymous. Term "include", "comprise", "have", "contain" or any other variation as used herein means to cover a non-exclusive comprising. For example, the compositions, steps, methods, products or devices including the listed elements should not be limited to those elements, but can comprise other elements not clearly listed or the elements for this kind of compositions, steps, methods, products or devices.

The conjunction "consist of" excludes any element, step or component not indicated. If used in a claim, this phrase would make the claim a closed claim and do not include materials other than those described materials, besides their related regular impurities. When the phrase "consist of" appears in the clause of the majority of a claim other than immediately after the subject matter, merely the element described in the clause is limited thereby with other elements not being excluded from said claim as a whole.

When equivalent, concentration or other value or parameter is expressed with a range, a preferred range, or series of ranges of upper preferred value and lower preferred value, it should be understood as all the ranges formed by pairing any upper value of the range or preferred value and any lower value of the range or preferred value are specifically disclosed no matter if the range is disclosed individually. For example, when the range "1 to 5" is disclosed, the described range should be explained as comprising ranges "1 to 4", "1 to 3", "1 to 2", "1 to 2 and 4 to 5", "1 to 3 and 5" and so on. When a number range is described herein, unless explained otherwise, the range aims to comprise the end value thereof and all of the integers and fractions within the range.

Singular form comprises plural objects for discussion, unless the context clearly indicates otherwise. "Optional" or "any one of" indicates items or events described thereafter can happen or not, and the description comprises the situation that the events happen and the situation that the events do not happen.

Expressions for approximation in the Description and Claims are used to qualify the amounts, indicating that the present application is not limited to the specific amount and further comprises a modified part near to the amount without leading the change of related basic functions. Accordingly, qualifying a value with "approximately", "about" or the like means that the present application is not limited to the specific value. In certain cases, expressions for approximation may correspond to the precisions of the instruments for measuring the values. In the Description and Claims of the present application, the limitations on ranges can be combined and/or exchanged, and unless explained otherwise, these ranges comprise all the sub-ranges included therein.

In order to solve the above technical problem, the first aspect of the present application provides a brightness enhancement film coating material, preparation raw materials for the coating material, in parts by weight, at least comprise the following components: 20-76 parts of a monofunctional photocuring monomer, 20-76 parts of a bifunctional photocuring monomer, 1-10 parts of a photoinitiator and 0-4 parts of an auxiliary agent.

In a more preferred embodiment, in the preparation raw materials for the coating material, the total of parts by weight of the monofunctional photocuring monomer and the bifunctional photocuring monomer is 70-98 parts.

Monofunctional Photocuring Monomer

In the present application, the monofunctional photocuring monomer provides 20-76 parts by weight of the preparation raw materials for the coating material.

In a preferred embodiment, the monofunctional photocuring monomer provides the following parts by weight of the preparation raw materials for the coating material, which can be referred to: 20 parts, 21 parts, 22 parts, 23 parts, 24 parts, 25 parts, 26 parts, 27 parts, 28 parts, 29 parts, 30 parts, 31 parts, 32 parts, 33 parts, 34 parts, 35 parts, 36 parts, 37 parts, 38 parts, 39 parts, 40 parts, 41 parts, 42 parts, 43 parts, 44 parts, 45 parts, 46 parts, 47 parts, 48 parts, 49 parts, 50 parts, 51 parts, 52 parts, 53 parts, 54 parts, 55 parts, 56 parts, 57 parts, 58 parts, 59 parts, 60 parts, 61 parts, 62 parts, 63 parts, 64 parts, 65 parts, 66 parts, 67 parts, 68 parts, 69 parts, 70 parts, 71 parts, 72 parts, 73 parts, 74 parts, 75 parts, 76 parts and so forth.

In a more preferred embodiment, the monofunctional photocuring monomer provides 25-70 parts by weight of the preparation raw materials for the coating material.

In the present application, the refractive index of the monofunctional photocuring monomer is not lower than 1.5.

In a preferred embodiment, the refractive index of the monofunctional photocuring monomer is higher than 1.5.

The refractive index is the ratio of the speed of light in vacuo to the speed of light in the medium. The higher the refractive index of a material, the better the ability to refract the incident light. The higher the refractive index, the thinner the lens (i.e., with the same thickness in the center, the same degree and the same material, a lens with a higher refractive index has a thinner edge than the one with a lower refractive index). The refractive index is closely related to the electromagnetic properties of the medium. According to classical electromagnetic theory, εr and μr are the relative capacitance and the relative permeability of the medium, respectively. The refractive index is also related to the frequency, which is called dispersion phenomenon. Total reflection occurs when light is directed from a relatively optically denser medium to a relatively optically thinner medium, and the incidence angle is greater than the critical angle.

In the present application, the fluid viscosity of the monofunctional photocuring monomer is not higher than 200 cps.

In a preferred embodiment, the fluid viscosity of the monofunctional photocuring monomer is lower than 200 cps.

In the present application, end groups of the monofunctional photocuring monomer are selected from one of methylacryloxy, acryloxy, ethenyl, allyl.

In a preferred embodiment, at least one of benzene ring, acrylate containing N, O heterocyclic structure; methacrylate containing N, O heterocyclic structure is contained in the structure of the monofunctional photocuring monomer.

In a preferred embodiment of the present application, the monofunctional photocuring monomer is selected from at least one of the followings: a monomer with the refractive index that is higher than 1.5, a monomer with the fluid viscosity that is lower than 200 cps, a monomer that adheres on PET base materials better.

The testing method for the monomer that has better adhesive strength on PET base materials: cross-cut test; standard: no specific standard, via observing the experimental formula, adding the ingredient can achieve the improved effect of adhering.

In the present application, the monomer with the refractive index that is higher than 1.5 is selected from at least one of o-phenylphenoxyethyl acrylate, (2 ethoxy)o-phenylphenoxyethyl acrylate, biphenylmethanol acrylate, phenoxybenzyl acrylate, m-phenoxybenzene methacrylate, 2-(p-isopropylphenyl-phenoxy)-ethyl acrylate.

In a preferred embodiment, the o-phenylphenoxyethyl acrylate, without specific limitation, can be referred to phenylphenol ethoxy acrylate (OPPEA); the source of phenylphenol ethoxy acrylate, without specific limitation, can be referred to Z&D Chem PP011, MIWON M1142, Norda N112, Eternal EM2105 and so forth.

In a preferred embodiment, the source of the (2 ethoxy) o-phenylphenoxyethyl acrylate (OPP(EO)2A), without specific limitation, can be referred to Norda N112 and so forth.

In a preferred embodiment, the source of the biphenylmethanol acrylate (BPMA), without specific limitation, can be referred to Wraio LuCure646 and so forth.

In a preferred embodiment, the source of the phenoxybenzyl acrylate (PBA), without specific limitation, can be referred to Wraio LuCure and so forth.

In a preferred embodiment, the source of the m-phenoxybenzene methacrylate (MPOBA), without specific limitation, can be referred to Eternal EM2050 and so forth.

In a preferred embodiment, the source of the 2-(p-isopropylphenyl-phenoxy)-ethyl acrylate (CPEA), without specific limitation, can be referred to Eternal EM2107 and so forth.

In a more preferred embodiment, in order to elevate the refractive index of the formula curing film and improve the luminance of the film, the monomer with the refractive index that is higher than 1.5 is selected from at least one of OPPEA, OPP(EO)$_2$A, BPMA, PBA, MPOBA.

In the present application, the monomer with the fluid viscosity that is lower than 200 cps is selected from at least one of benzyl acrylate, biphenylmethanol acrylate, 2-phenoxyethyl acrylate, (2 ethoxy)phenoxy acrylate, (3 ethoxy) phenoxy acrylate, acryloylmorpholine, 2-phenoxyethyl methacrylate, m-phenoxybenzene methacrylate.

In a preferred embodiment, the source of the benzyl acrylate (PBA), without specific limitation, can be referred to Wraio LuCure and so forth.

In a preferred embodiment, the source of the biphenylmethanol acrylate (BPMA), without specific limitation, can be referred to Wraio LuCure 646) and so forth.

In a preferred embodiment, the source of the 2-phenoxyethyl acrylate (PHEA), without specific limitation, can be referred to Eternal EM210, Sartomer SR339 and so forth.

In a preferred embodiment, the source of the (2 ethoxy) phenoxy acrylate (PH(EO)$_2$A), without specific limitation, can be referred to Eternal EM2101 and so forth.

In a preferred embodiment, the source of the (3 ethoxy) phenoxy acrylate (PH(EO)$_3$A), without specific limitation, can be referred to Eternal EM2103 and so forth.

In a preferred embodiment, the source of the acryloylmorpholine (ACMO), without specific limitation, can be referred to LuCure248 and so forth.

In a preferred embodiment, the source of the m-phenoxybenzene methacrylate (MPOBA), without specific limitation, can be referred to Eternal EM2050 and so forth.

In a more preferred embodiment, in order to adjust the viscosity of the system and achieve a better fluidity for an easier coating material, the monomer with the fluid viscosity that is lower than 200 cps is selected from at least one of PBA, BPMA, PHEA, PH(EO)$_2$A, ACMO.

In the present application, the monomer that adheres on PET base materials better is selected from at least one of o-phenylphenoxyethyl acrylate, m-phenoxybenzene methacrylate, 2-(p-isopropylphenyl-phenoxy)-ethyl acrylate, benzyl acrylate.

In a preferred embodiment, the source of the o-phenylphenoxyethyl acrylate (OPPEA), without specific limitation, can be referred to Z&D Chem PP011, MIWON M1142, Norda N112, Eternal EM2105 and so forth.

In a preferred embodiment, the source of the m-phenoxybenzene methacrylate (MPOBA), without specific limitation, can be referred to Eternal EM2050 and so forth.

In a preferred embodiment, the source of the 2-(p-isopropylphenyl-phenoxy)-ethyl acrylate (CPEA), without specific limitation, can be referred to Eternal EM2107 and so forth.

In a preferred embodiment, the source of the benzyl acrylate (BA), without specific limitation, can be referred to Eternal EM75 and so forth.

In a more preferred embodiment, in order to improve the matter of fragmenting during clipping, the monomer that adheres on PET base materials better is selected from at least one of OPPEA, OPP(EO)$_2$A, MPOBA, CPEA.

Bifunctional Photocuring Monomer

In the present application, the bifunctional photocuring monomer provides 20-76 parts by weight of the preparation raw materials for the coating material.

In a preferred embodiment, the bifunctional photocuring monomer provides the following parts by weight of the preparation raw materials for the coating material, which can be referred to: 20 parts, 21 parts, 22 parts, 23 parts, 24 parts, 25 parts, 26 parts, 27 parts, 28 parts, 29 parts, 30 parts, 31 parts, 32 parts, 33 parts, 34 parts, 35 parts, 36 parts, 37 parts, 38 parts, 39 parts, 40 parts, 41 parts, 42 parts, 43 parts, 44 parts, 45 parts, 46 parts, 47 parts, 48 parts, 49 parts, 50 parts, 51 parts, 52 parts, 53 parts, 54 parts, 55 parts, 56 parts, 57 parts, 58 parts, 59 parts, 60 parts, 61 parts, 62 parts, 63 parts, 64 parts, 65 parts, 66 parts, 67 parts, 68 parts, 69 parts, 70 parts, 71 parts, 72 parts, 73 parts, 74 parts, 75 parts, 76 parts and so forth.

In a more preferred embodiment, the bifunctional photocuring monomer provides 25-70 parts by weight of the preparation raw materials for the coating material.

In the present application, the structure of the bifunctional photocuring monomer is shown as formula 1; R, R' are selected respectively from one of methylacryloxy, acryloxy, ethenyl, allyl; $R_1$, $R_2$ are selected respectively from one of hydrogen, alkyl, alkoxy; m, n are natural number;

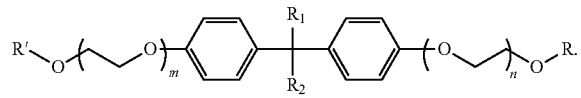

1

In a preferred embodiment, the bifunctional photocuring monomer is BPA(EO)$_{m+n}$DA and/or BPA(EO)$_{m+n}$DMA; the structure of the BPA(EO)$_{m+n}$DA is shown as formula 2; the structure of the BPA(EO)$_{m+n}$DMA is shown as formula 3;

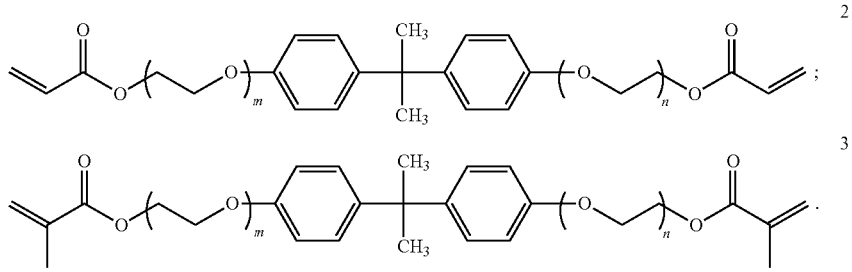

In the present application, 2≤m+n≤40.

It is found by the applicant that, when 2≤m+n≤40, this type of monomer has adjustable ethoxy chain segment; with the ethoxy chain segment shortens (for example, 2≤m+n≤6), this type of monomer shows properties of faster reaction rate, higher hardness, which increases the cure degree of the system and reduces fragmenting; with the ethoxy chain length increases (for example, 7≤m+n≤40), this type of monomer has good flexibility and can provide remarkable self-repairing property. Meanwhile, the more the number of ethoxy chain segments, the better the self-repairing property and the lower the refractive index. Therefore, the bifunctional photocuring monomer with long ethoxy chain should be used together with the monofunctional photocuring monomer with high refractive index such as OPPEA, CPEA and so forth to achieve required refractive index; and the monomer with short ethoxy chain can be used together with the PH(EO)$_2$A, PHEA, hydrofurfuryl acrylate (THFA) type of monofunctional photocuring monomers to decrease the hardness. In the present application, since the fast reaction rate of the bifunctional photocuring monomer with short ethoxy chain and the high extent of reaction of its system, the coating material prepared from the bifunctional photocuring monomer with short ethoxy chain has a property of an excellent reliability test result; and since the reaction rate of the bifunctional photocuring monomer with long ethoxy chain is slow, it should be used together with the monofunctional photocuring monomer with faster reaction rate to increase the curing extent of the system, and thereby improve the property of the reliability test result of the coating material prepared from the bifunctional photocuring monomer with long ethoxy chain.

In a preferred embodiment, 10<m+n≤40; this kind of monomer has longer ethoxy repeating chain segment, can provide good flexibility and self-repairing property. However, during the study process, the applicant found that the additive amount of this kind of monomer should not be overmuch, typically less than 20 parts by weight; if the additive amount thereof exceeds 20 parts by weight, the refractive index of the coating material prepared thereby will be significantly affected, even an addition of more other monomers with high refractive index can hardly balance it. Therefore, it would be difficult to meet the brightness enhancing requirement on the brightness enhancement film, the adhesive strength and crosslinking density will be affected and in turn, the improvement of the problem of fragmenting during clipping and the problem of reliability test will be affected.

In a preferred embodiment, 7≤m+n≤10; this kind of monomer has moderate ethoxy repeating chain segment, which has good flexibility and will not cause too much loss of refractive index, but it need to be used together with the monomer with short chain (2≤m+n≤6) and the monomer with long chain (m+n>10), then the properties of flexibility and refractive index can be better balanced. After curing monomers with various chain segment lengths, an appropriate crosslinking density can be achieved. A preferred adding amount range of this type of monomer is 0-40 parts by weight. If this type of monomer is added, the monomer with short chain used together is preferred to be 15-40 parts by weight and the monomer with long chain used together is preferred to be 5-15 parts by weight.

In a preferred embodiment, 2≤m+n≤6; this kind of monomer has less ethoxy repeating chain segment and is preferred to be used together with the monomer with long chain (m+n>10) of at least 10 parts by weight or the monomer (m+n≥7) of at least 30 parts by weight and other monomers, then a better flexibility can be achieved.

Photoinitiator

In the present application, the auxiliary agent provides 1-10 parts by weight of the preparation raw materials for the coating material.

In a preferred embodiment, the monofunctional photocuring monomer provides the following parts by weight of the preparation raw materials for the coating material, which can be referred to: 1 part, 1.5 parts, 2 parts, 2.5 parts, 3 parts, 3.5 parts, 4 parts, 4.5 parts, 5 parts, 5.5 parts, 6 parts, 6.5 parts, 7 parts, 7.5 parts, 8 parts, 8.5 parts, 9 parts, 9.5 parts, 10 parts and so forth.

In a more preferred embodiment, the auxiliary agent provides 1-4 parts by weight of the preparation raw materials for the coating material.

In the present application, the photoinitiator, without specific limitation, is well known for the skilled artisan.

In a preferred embodiment, the photoinitiator is α-hydroxyalkyl ketone type photoinitiators and/or acyl oxide type initiators.

In a more preferred embodiment, the photoinitiator is selected from at least one of photoinitiator 184, photoinitiator TPO, photoinitiator 1173.

During the study process, the applicant found that when the photoinitiator in this system at least comprises photoinitiator TPO and is used together with at least one of photoinitiator 184, photoinitiator 1173, the coating material will be more fully cured and achieve ideal curing extent.

Auxiliary Agent

In the present application, the auxiliary agent provides 0-4 parts by weight of the preparation raw materials for the coating material.

In a preferred embodiment, the auxiliary agent provides the following parts by weight of the preparation raw materials for the coating material, which can be referred to: 0 part, 0.1 parts, 0.2 parts, 0.3 parts, 0.4 parts, 0.5 parts, 0.6 parts, 0.7 parts, 0.8 parts, 0.9 parts, 1.0 part, 1.1 parts, 1.2 parts, 1.3 parts, 1.4 parts, 1.5 parts, 1.6 parts, 1.7 parts, 1.8 parts, 1.9 parts, 2.0 parts, 2.1 parts, 2.2 parts, 2.3 parts, 2.4 parts, 2.5 parts, 2.6 parts, 2.7 parts, 2.8 parts, 2.9 parts, 3.0 parts, 3.1 parts, 3.2 parts, 3.3 parts, 3.4 parts, 3.5 parts, 3.6 parts, 3.7 parts, 3.8 parts, 3.9 parts, 4.0 parts and so forth.

In a more preferred embodiment, the auxiliary agent provides the 0-1 part by weight of the preparation raw materials for the coating material.

In the present application, the auxiliary agent at least comprises a slip agent.

In a preferred embodiment, the slip agent is a polyether modified organosilicon compound.

In a more preferred embodiment, the source of the polyether modified organosilicon compounds, without specific limitation, can be achieved by self-made, and also purchasing; the commercial source of the polyether modified organosilicon compounds can be referred to BYK-333, BYK-3505, BYK 3500, BYK 3510, SF-761C, TEGO 450, TEGO 410 and so forth; the structures of the polyether modified organosilicon compounds can be referred to

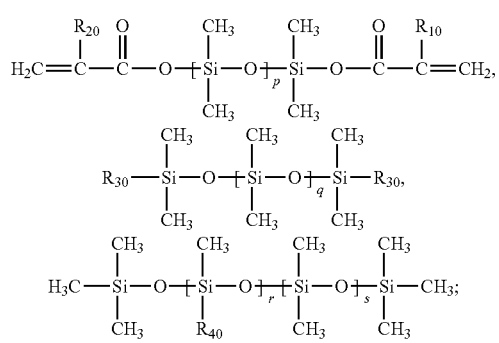

wherein $R_{10}$, $R_{20}$ are H or methyl, p is integer between 3-50; q is any integer in the range of 10-100; the structure of $R_{30}$ is

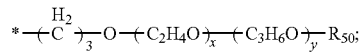

both of x and y are any integers in the range of 1-15; $R_{50}$ is hydrogen or

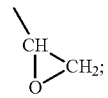

both of r and s are any integers in the range of 0-100, and r plus s equal to 100; the structure of $R_{40}$ is

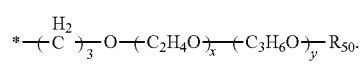

During the study process, the applicant found that since the organosilicon auxiliary agent typically migrates to the surface after curing, after a high-temperature high-humidity reliability test, a precipitation of the auxiliary agent itself easily appears on the surface of the film or white streaks are produced after being used together with a polaroid, which affects the image. Therefore, the reactive auxiliary agent selected in the present system can reduce the effect of auxiliary agent migration; regarding non-reactive auxiliary agent, the effect of auxiliary agent migration can be reduced though elevating the react speed or degree of crosslinking of the system.

The second aspect of the present application provides the method for preparing the brightness enhancement film coating material, comprising the following steps: mixing the monofunctional photocuring monomer, the bifunctional photocuring monomer, the photoinitiator, the auxiliary agent, then stirring the mixture well to obtain the coating material.

In a preferred embodiment, the speed and the time for stirring can just meet an even mixture; during preparation of the coating material of the present application, the speed for stirring is preferred to be more than 500 rpm, further preferred to be 500-2000 rpm; the time for stirring is preferred to be more than 30 min, further preferred to be 30-120 min; during preparation of the coating material of the present application, solid particle impurity is filtered using a filter bag after each raw material is evenly mixed.

The followings are specific description of the present application via embodiments. It is necessary to point out here that the following embodiments are merely used for further explanation of the present application and should not be understood as a limitation of the protection scope of the present application, and some non-essential improvements and adjustments made by a person skilled in the art according to the above-mentioned contents of the present application still fall within the protection scope of the present application.

In addition, all of the raw materials are commercially available unless explained otherwise.

EXAMPLES

The present application is further detailed described below in the combination of Examples, but the embodiments of the present application are not limited within these.

brightness enhancement film with hands wearing nitrile gloves at 25° C. and observe the amount of the dropped coating material.

3. Reliability test: after matching and assembling the brightness enhancement film with other components such as polaroid and the like, place the same under the condition of 85° C., 85RH % for 240H and observe the surface for abnormal images. After testing, not any badness in the image is excellent, image badness present in a small area is good, and image badness present in a large area is poor.

TABLE 1

| Component | Example 1 | Example 2 | Example 3 | Example 4 | Example 5 | Example 6 | Comparative Example b1 | Comparative Example 2 |
|---|---|---|---|---|---|---|---|---|
| Monofunctional Photocuring Monomer (OPPEA) | 45 | 10 | 20 | 26 | 20 | 20 | 35 | 10 |
| Monofunctional Photocuring Monomer (PHEA) | 21 | 10 | 10 | 33 | 26 | 26 | 50 | 0 |
| Monofunctional Photocuring Monomer (ACMO) | 10 | 0 | 6 | 6 | 5 | 5 | 0 | 0 |
| Bifunctional Photocuring Monomer [BPA(EO)$_4$DA] | 0 | 37 | 27 | 18 | 15 | 18 | 0 | 22 |
| Bifunctional Photocuring Monomer [BPA(EO)$_{10}$DA] | 0 | 30 | 30 | 0 | 25 | 19 | 0 | 40 |
| Bifunctional Photocuring Monomer [BPA(EO)$_{30}$DA] | 20 | 9 | 6 | 13 | 10 | 13 | 10 | 23 |
| Photoinitiator 184 | 3 | 3 | 3 | 3 | 3 | 3 | 3 | 3 |
| Auxiliary Agent (BYK 333) | 0.5 | 0.5 | 0.5 | 0.5 | 0.5 | 0.5 | 0.5 | 0.5 |
| Performances Test | | | | | | | | |
| Adhesive Strength | 5B | 4B | 5B | 5B | 5B | 5B | 5B | 2B |
| Fragmenting During Clipping | No obvious fragments observed | A few fragments | A few fragments | A few fragments | No obvious fragments observed | No obvious fragments observed | Many fragments | Many fragments |
| Reliability Test | Excellent | Excellent | Good | Good | Good | Good | Poor | Poor |

The instruction and performances testing results of components used in the Examples and Comparative Examples as well as their amounts (in parts by weight) are shown in Tables 1-3; in the Examples, OPPEA is Eternal EM2105; PHEA is Eternal EM210; MPBOA is Eternal EM2050; BPA(EO)$_4$DA is Eternal EM2261; BPA(EO)$_{10}$DA is Eternal EM2265; BPA(EO)$_{20}$DA is Eternal EM2269; photoinitiator 184 is Eternal PI 184; photoinitiator 1173 is Eternal PI 1173; photoinitiator TPO is Eternal PI TPO; ACMO is Wraio LuCure248.

Performances Testing

1. Adhesive strength: adhesive strength of the coating material is tested through cross-cutting at 23±2° C. The adhesive strengths from good to poor are 5B, 4B, 3B, 2B, B.
2. Fragmenting during clipping: after clipping the brightness enhancement film with a knife, rub the edge of the Comparing Examples 1-6 with Comparative Example 1, Comparative Example 2, a better reliability and a reduced fragmenting during clipping can be achieved when the monofunctional photocuring monomer and the bifunctional photocuring monomer fall in said range.

TABLE 2

| Component | Example 7 | Example 8 | Comparative Example 3 | Comparative Example 4 |
|---|---|---|---|---|
| Monofunctional Photocuring Monomer (OPPEA) | 20 | 20 | 20 | 20 |
| Monofunctional Photocuring Monomer (PHEA) | 26 | 26 | 26 | 21 |

TABLE 2-continued

| Component | Example 7 | Example 8 | Comparative Example 3 | Comparative Example 4 |
|---|---|---|---|---|
| Monofunctional Photocuring Monomer (MPOBA) | 5 | 5 | 5 | 5 |
| Bifunctional Photocuring Monomer [BPA(EO)$_4$DA] | 14 | 14 | 14 | 14 |
| Bifunctional Photocuring Monomer [BPA(EO)$_{10}$DA] | 19 | 19 | 19 | 14 |
| Bifunctional Photocuring Monomer [BPA(EO)$_{30}$DA] | 12 | 12 | 12 | 12 |
| Photoinitiator 184 | 2 | 0 | 2 | 12 |
| Photoinitiator TPO | 1 | 1 | 0 | 1 |
| Photoinitiator 1173 | 0 | 2 | 0 | 2 |
| Auxiliary Agent (BYK 333) | 0.5 | 0.5 | 0.5 | 0.5 |
| Performances Test | | | | |
| Adhesive Strength | 5B | 5B | 5B | 4B |
| Fragmenting During Clipping | Few | Few | Few | Many |
| Reliability Test | Excellent | Excellent | Good | Poor |

Comparing Example 7, Example 8 with Comparative Example 3, reaction rate of the system is increased via adding photoinitiator TPO, which makes small molecule monomers react more thoroughly and better reliability results can be achieved. In Comparative Example 4, excess initiator leads to the reduction of the chain length and the curing extent of the macromolecule after curing, which causes more fragments during clipping and poor reliability test.

TABLE 3

| Component | Example 9 | Comparative Example 6 |
|---|---|---|
| monofunctional photocuring monomer (OPPEA) | 26 | 24 |
| monofunctional photocuring monomer (PHEA) | 20 | 18 |
| monofunctional photocuring monomer (MPOBA) | 5 | 5 |
| bifunctional photocuring monomer [BPA(EO)$_4$DA] | 10 | 10 |
| bifunctional photocuring monomer [BPA(EO)$_{10}$DA] | 19 | 19 |
| bifunctional photocuring monomer [BPA(EO)$_{30}$DA] | 16 | 16 |
| photoinitiator 184 | 2 | 2 |
| auxiliary agent (BYK 3505) | 0.5 | 0 |
| auxiliary agent (TEGO 450) | 0 | 0.5 |
| Performances Test | | |
| Adhesive Strength | 5B | 5B |
| Fragmenting During Clipping | Few | Few |
| Reliability Test | Excellent | Good |

Comparing Example 9 with Comparative Example 6, the reactive auxiliary agent BYK 3505 that can take part in UV reactions (TEGO 450 cannot take part in US reactions) enables the reduction of the migration of the auxiliary agent in the coating material after reaction, and a better reliability result is embodied.

The foregoing examples are illustrative only and are intended to explain some of the features of the methods described in the present application. The attached claims are intended to claim a broadest possible scope as conceivable, and the Examples presented herein are only descriptions of the chosen embodiments according to a combination of all possible Examples. Therefore, the applicant's intention is that the attached claims are not limited by the selection of examples that illustrate the characteristics of the present application. Some of the numerical ranges used in the claims also include subranges within them, and variations in these ranges should also be interpreted to be covered, where possible, by the attached claims.

INDUSTRIAL APPLICABILITY

The brightness enhancement film coating material involved in the present application can be applied to the technical field of display material.

The invention claimed is:

1. A brightness enhancement film coating material, wherein, preparation raw materials for the coating material, in parts by weight, at least comprise the following components: 20-76 parts of a monofunctional photocuring monomer, 20-76 parts of a combination of bifunctional photocuring monomers, 1-10 parts of a photoinitiator and 0-4 parts of an auxiliary agent;
   wherein, the bifunctional photocuring monomers are selected from the group consisting of BPA(EO)$_{m+n}$DA, BPA(EO)$_{m+n}$DMA, and combinations thereof; the structure of the BPA(EO)$_{m+n}$DA is shown as formula 2, and the structure of the BPA(EO)$_{m+n}$DMA is shown as formula 3;

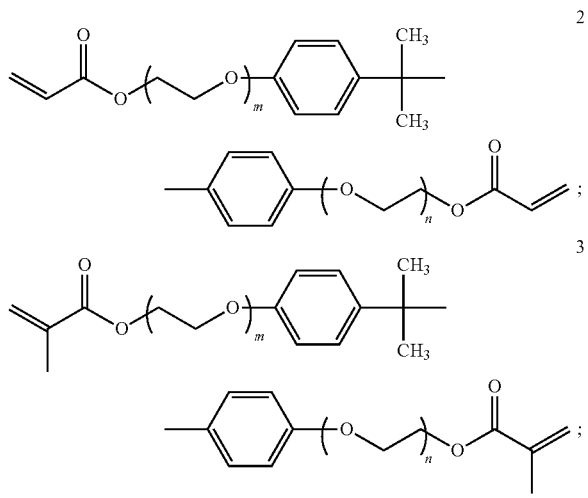

and
   wherein the combination of the BPA(EO)$_{m+n}$DA and/or the BPA(EO)$_{m+n}$DMA monomers is:
      from 0-40 parts 7≤m+n≤10,
      from 15-40 parts 2≤m+n≤6, and
      from 5-15 parts m+n>10.

2. The brightness enhancement film coating material according to claim 1, wherein, the refractive index of the monofunctional photocuring monomer is not lower than 1.5.

3. The brightness enhancement film coating material according to claim 1, wherein, the fluid viscosity of the monofunctional photocuring monomer is not higher than 200 cps.

4. The brightness enhancement film coating material according to claim 1, wherein, end groups of the monofunctional photocuring monomer are selected from the group consisting of methylacryloxy, acryloxy, ethenyl, and allyl.

5. The brightness enhancement film coating material according to claim 1, wherein, the auxiliary agent at least comprises a slip agent.

6. The brightness enhancement film coating material according to claim 5, wherein, the slip agent is a polyether modified organosilicon compound.

7. A LED display module comprising the brightness enhancement film coating material according to claim 1.

* * * * *